(12) United States Patent
Linn (10) Patent No.: US 11,495,116 B2
(45) Date of Patent: Nov. 8, 2022

(54) HOME HEALTH OPTIMIZATION

(71) Applicant: Shipshape Solutions, Inc., Austin, TX (US)

(72) Inventor: Alexander Saunders Linn, Dallas, TX (US)

(73) Assignee: SHIPSHAPE SOLUTIONS, INC., Austin, TX (US)

( * ) Notice: Subject to any disclaimer, the term of this patent is extended or adjusted under 35 U.S.C. 154(b) by 0 days.

(21) Appl. No.: 17/215,955

(22) Filed: Mar. 29, 2021

(65) Prior Publication Data

US 2021/0312789 A1    Oct. 7, 2021

Related U.S. Application Data

(60) Provisional application No. 63/003,725, filed on Apr. 1, 2020.

(51) Int. Cl.
| | |
|---|---|
| *G08B 23/00* | (2006.01) |
| *G08B 27/00* | (2006.01) |
| *G08B 25/01* | (2006.01) |
| *G08B 25/00* | (2006.01) |

(52) U.S. Cl.
CPC .......... *G08B 23/00* (2013.01); *G08B 25/007* (2013.01); *G08B 25/016* (2013.01); *G08B 27/00* (2013.01)

(58) Field of Classification Search
CPC ...................................................... G08B 23/00
See application file for complete search history.

(56) References Cited

U.S. PATENT DOCUMENTS

| | | | |
|---|---|---|---|
| 10,229,394 B1* | 3/2019 | Davis | H04L 41/5074 |
| 2007/0118638 A1* | 5/2007 | Ban | G05B 23/0272 |
| | | | 709/224 |
| 2014/0266671 A1 | 9/2014 | Huynh et al. | |
| 2015/0256563 A1 | 9/2015 | Le Guen et al. | |
| 2016/0179159 A1 | 6/2016 | van Campen et al. | |

OTHER PUBLICATIONS

International Search Report for PCT Application No. PCT/US2021/024658 dated Jul. 20, 2021, 6 pages.
Written Opinion for PCT Application No. PCT/US2021/024658 dated Jul. 20, 2021, 6 pages.

* cited by examiner

*Primary Examiner* — Travis R Hunnings
(74) *Attorney, Agent, or Firm* — Klintworth & Rozenblat IP LLP (57) ABSTRACT

The present invention comprises a novel Virtual Facilities Manager architecture that optimizes home health by combining multiple prediction engines, fed by continuously monitored and processed sensor-based and environmental data (historical as well as current), with an integrated Homecare Network of homeowners and service and other providers. This enables a continuous feedback process in which abnormal conditions (symptoms of an underlying problem, including suboptimal performance) are detected and addressed by issuing contextual alerts with associated actions (related alert-action pairs) in an iterative manner over time. By maintaining a Home Health Record including Scores (e.g., reliability and energy efficiency) representing the systemic state of one or more homes, the present invention detects not only maintenance issues, but also suboptimal performance "problems," and addresses them with the same iterative troubleshooting approach until such scores return to an acceptable level.

27 Claims, 5 Drawing Sheets

HOME HEALTH OPTIMIZATION

CROSS-REFERENCE TO RELATED APPLICATIONS

This application claims priority to U.S. provisional patent application Ser. No. 63/003,725, filed Apr. 1, 2020 and entitled "Virtual Maintenance," the disclosure of which is hereby incorporated by reference as if fully set forth herein.

BACKGROUND

Field of Art

The present invention relates generally to the automated optimization of the health of residential and commercial infrastructure, and more particularly to sensor-based systems that quantify dynamic changes to the systemic health of one or more properties, diagnose abnormal conditions (including suboptimal performance) and perform proactive iterative troubleshooting steps that facilitate actions by owners and service providers to address the underlying causes of such abnormal conditions efficiently over time.

Description of Related Art

The long-term maintenance of equipment and other infrastructure on the premises of virtually any home or business is a well-known problem that has received relatively little attention over the years. Even less frequently addressed is the systemic performance of a residence or neighborhood and its component equipment systems and infrastructure.

For example, higher-level concepts such as reliability and energy efficiency are routinely considered during the planning and construction of a building. But such concepts are rarely if ever monitored and optimized as conditions change over time after the buildings are occupied. Moreover, while one can quantify such concepts with respect to individual equipment, it is much more difficult to do so at a more systemic level involving equipment systems or an entire household or neighborhood.

While much of the following discussion relates to residential infrastructure (such as HVAC, water control, pool and solar systems, as well as plumbing, electrical, crawl spaces, etc.), the problems and solutions set forth below apply equally to infrastructure and industrial equipment in commercial businesses, government entities and other small, medium and large enterprises.

Homeowners, for example, typically treat their home's infrastructure as silos of expensive items of equipment (refrigerators, freezers, AC units, furnaces, boilers, sump pumps, dehumidifiers, pool pumps, solar panels, etc.) that operate over relatively long periods of time and require only occasional repair and (only if necessary) eventual replacement. Homeowners often are unaware of problems before conspicuous symptoms arise, are uncertain of which provider can best address such symptoms, and are hesitant to incur the expense of calling service technicians unless and until significant problems are evident.

Moreover, homeowners often do not maintain such equipment as frequently as recommended. When they do eventually call service technicians, problems are often more severe and require relatively expensive repairs. As a result of such "reactive" maintenance, the life of such equipment is often shorter, while its cost of ownership is higher and its operation over time is less efficient than if such equipment had been maintained in a proactive and more effective manner.

It should be noted that the term "maintenance" is used herein to address an array of different types of problems that occur with respect to a property's equipment and other infrastructure. For example, particular equipment may be in need of "repair" because one or more of its components are broken and need to be fixed. Or "preemptive maintenance" may be recommended to avoid a future repair, thereby enhancing reliability and reducing overall costs. Or the "operational performance" of particular equipment may fail to satisfy a homeowner's desired level of efficiency or comfort, or may simply be suboptimal, potentially indicating an emerging risk.

Moreover, any of these and other related types of problems may be systemic in that they are not isolated to a single piece of equipment, and may involve systems of equipment or even whole-home or multi-home issues. The interdependence among the equipment and infrastructure of a home only exacerbates the difficulty of troubleshooting certain problems. Such systemic problems may require systemic solutions, such as adding, upgrading or replacing particular equipment, modifying device settings or otherwise altering a home's infrastructure.

As "smart homes" and the "Internet of Things" ("IoT") have proliferated, so too has the ability to monitor device operation and detect abnormal conditions—particularly with the application of machine learning and other forms of artificial intelligence ("AI"). Yet the primary focus of these smart systems has been on the control and interoperability of connected devices, rather than on the detection of abnormal conditions and the extensive troubleshooting expertise necessary to resolve many such conditions.

Some existing smart home systems monitor device characteristics that change over time and generate automated alerts or notifications when an abnormal condition or actionable event is detected. For example, a system from Alert Labs (described in published US patent applications 2018/0365957 and 2018/0375680) employs water, temperature, electrical and other sensors to monitor characteristics of particular equipment (HVAC systems, sump pumps, etc.) and the general environment within the home. It further includes an analytics engine (e.g., employing machine learning) to analyze the sensor data for the purpose of detecting abnormal conditions and issuing alerts to notify homeowners.

But, not unlike the satirical "dental monitor" television commercials in which a patient is diagnosed with a dental problem (e.g., a cavity) yet is sent home without the problem being fixed, these systems offer little in the way of resolving abnormal conditions beyond providing an alert or notification of the condition. While there is certainly significant benefit to early detection of minor as well as urgent problems, homeowners are left to their own devices to troubleshoot and address such problems. As a result, they will still likely adopt a "reactive" approach, whether they frequently call service technicians or procrastinate due to cost concerns.

Other systems go a step beyond merely monitoring devices and providing alerts indicating the existence of abnormal conditions. For example, a system from Google (described in U.S. Pat. No. 10,423,135) monitors the activities of occupants as well as the operation of devices in the home. In response to detecting that certain specified conditions within predefined user policies are satisfied, it implements such user policies by adjusting the configuration or operation of various devices (such as locking or unlocking doors, turning specified lights on or off, adjusting the temperature settings of thermostats to increase energy efficiency, etc.).

While allowing for user input and goal-based device control is beneficial, it does not address the problem of detecting abnormal conditions (as opposed to detecting conditions that merely satisfy a predefined user policy). Even more importantly, it does not address the difficult task of iteratively troubleshooting and addressing such abnormal conditions over time. In other words, the Google system does not suggest how it could detect an abnormal condition such as a faulty component of an HVAC system or pool pump, much less how it would troubleshoot such a problem.

Still other systems, such as one from Powerhouse Dynamics (described in U.S. Pat. No. 8,649,987), have taken a narrower approach to monitoring the performance of individual appliances (e.g., on dedicated circuit breakers). The Powerhouse Dynamics system measures an appliance's electrical consumption over time and compares its performance to that of other appliances stored in the system's database (e.g., appliances of the same model, as well as other comparable appliances, such as newer and more energy-efficient ones).

Upon detecting a significant variance in the performance of the appliance as compared to that of other appliances in its database (such as irregular or particularly inefficient electrical usage), the system not only issues an alert to notify the user, but also includes a recommendation from its "recommendation database." Such recommendations include information on cost/energy savings of other comparable appliances, as well as appliance diagnostics and manufacturer-recommended remedial or corrective actions (such as turning an appliance or its circuit on or off).

While the inclusion of such additional recommendations is useful, this system still falls far short of providing actions that are tantamount to the iterative series of steps that users and service providers would perform over time to troubleshoot and address underlying problems, as opposed to the symptoms corresponding to the alert. Moreover, the Powerhouse Dynamics system is limited not only to monitoring electrical consumption, but to monitoring the performance characteristics of an individual appliance (as opposed to taking a systemic approach to detecting and resolving abnormal conditions). In other words, it fails to obtain (and therefore cannot utilize in its recommendations) a "contextual awareness" of the home's operation over time.

As alluded to above, abnormal conditions cover a wide gamut of potential problems, many of which are extremely difficult to troubleshoot, even for a professional service provider. Only the most trivial of such problems is likely to be resolved by a manufacturer-supplied recommended step or procedure (even assuming the problem is confined to that single appliance).

Moreover, it is inefficient for homeowners to choose between calling a service technician whenever the slightest symptom appears (assuming the homeowner is even aware of who to call), or to wait until severe symptoms arise. There is clearly a need for a system that performs iterative troubleshooting on a recurring basis over time, and offloads a significant portion of this complex task from homeowners and providers.

Many complex problems require that steps be taken over time, with subsequent steps dependent on the results of prior ones, as well as on changes that may only be reflected by monitoring sensor-based and environmental data. Subsequent symptoms may differ, but still be related to one another (and to one or more underlying problems) over time, and may even involve multiple appliances or other infrastructure in the home.

In an ideal world, one would have access to a free professional facilities manager onsite on a 24/7 basis, who needed no sleep and had a perfect memory of all (current and historical) local sensor and external environmental data, as well as performance models of all equipment and other infrastructure that are or could be installed in the home (not to mention the ability to detect suboptimal performance with respect to higher-level concepts such as energy efficiency throughout the home).

Such an ideal "virtual facilities manager" would detect, anticipate and address all such problems in a systemic manner that aligns the goals of homeowners and various service and other providers, and thus reveals the many shortcomings in these existing systems, including additional cost due to a reactive maintenance approach, lower efficiency of equipment operation over time and an inability to detect and resolve systemic problems affecting multiple items of equipment and infrastructure, among others.

In short, there remains a need for a system that not only can monitor (on a continuous basis) sensor-based and external environmental data relating to the operation of equipment and other infrastructure in the home, and detect abnormal conditions over time (from a systemic as well as individual device perspective), but also can address such abnormal conditions by issuing contextual alerts and simulating the iterative troubleshooting steps (with the integral involvement of homeowners and providers) that a theoretical virtual facilities manager would perform over time.

Such a system would, in effect, go well beyond a "check engine light for the home," in that it would eliminate the need for many expensive service calls and, when certain service calls were necessary, would provide service providers with a valuable "head start" in the troubleshooting process. Service providers would also benefit not only from the leads they can obtain via such an automated system, and from the ability to handle a greater quantity of less complex service calls, but also from the interactive relationships they can develop and maintain with customers via such an integrated system.

Moreover, such a system would optimize the health of the home (in accordance with an owner's predefined goals) by continually monitoring and quantifying higher-level systemic health indicators (such as reliability, energy efficiency and maintenance costs), issuing alerts upon detecting suboptimal performance and recommending and facilitating the implementation of iterative troubleshooting steps to address such suboptimal performance.

SUMMARY

The present invention addresses the shortcomings of existing systems described above with a novel "Virtual Facilities Manager" architecture that combines multiple prediction engines, fed by continuously monitored and processed sensor-based and environmental data (historical as well as current), with integrated networks of homeowners and service and other providers, such as manufacturers, retailers, installers, insurers, home warranty companies and even institutional home-maintenance providers. The integration of these various components into a Virtual Facilities Manager ("VFM") system enables a continuous feedback process in which abnormal conditions are detected and addressed by issuing contextual alerts with associated actions in an iterative manner over time, recognizing that many underlying problems can only be addressed effectively via a complex diagnostic and iterative troubleshooting process requiring multiple related actions over time ("related alert-action pairs").

At a conceptual level, the VFM system optimizes "home health" by employing a proactive and iterative troubleshooting process that detects and addresses a variety of underlying problems as they arise over time. Certain problems involve a single item of equipment, while others are systemic in nature. Whether systemic or otherwise, some problems reflect broken components in need of repair, while others reflect preemptive maintenance issues designed to maintain "healthy" and reliable operation to avoid future repairs, and still others reflect suboptimal operation of the home and its component systems over time (such as a gradual decrease in systemic energy efficiency, not easily remedied, for example, by the replacement or upgrade of one item of equipment).

Contextual alerts take into account the interdependencies among systems of equipment and home infrastructure, as well as external environmental factors. As a result, the VFM system anticipates prospective problems and acts accordingly. In this regard, the VFM system anticipates corresponding systemic solutions—in particular, the next action most likely to resolve the underlying problem of which the current alert is but a symptom. Over time, the solution (a set of related alert-action pairs) may well involve multiple pieces of equipment or other infrastructure throughout the home.

Moreover, by integrating homeowner and provider networks (i.e., into a "Homecare Network"), the VFM system expands its iterative troubleshooting approach to align the goals of homeowners and providers. For example, the VFM system generates actions that are optimized to satisfy specified "User Goals" relating to cost, energy efficiency, reliability and a host of other related factors (alone or in combination) as described below. Such actions also take into account the capabilities of particular occupants—e.g., to perform particular tasks themselves rather than requiring help from an external provider.

In one embodiment, the VFM system also takes into account "Provider Goals" and capabilities. For example, the VFM system may recommend a service provider with specific expertise matching the suspected problem diagnosed via a series of related alert-action pairs. Beyond service providers, the VFM system also assesses the goals as well as the capabilities of other providers (e.g., insurers and home warranty companies) to align such goals with those of particular homeowners (as discussed below).

As will become apparent from the following discussion, the VFM system provides significant advantages to both homeowners and providers. While early-warning alerts are useful to providers as well as to homeowners, they are in the first instance most useful to the VFM system itself, which logs alerts (that may or may not exceed a threshold for informing homeowners or providers) as well as actions in a "Home Health Record" for subsequent use by the VFM system in generating future alerts and corresponding actions.

Certain alerts are handled entirely by the VFM system itself, whether or not the homeowner is notified. For example, the VFM system may reset or "cycle" a device as an initial troubleshooting step to address the abnormal condition that gave rise to the alert. In a subsequent iteration (e.g., after an appropriate period of time has elapsed), the system may or may not generate that same alert, depending upon the extent to which this first troubleshooting step was effective.

In other situations, the VFM system may ask the homeowner to perform that step. For example, one troubleshooting step may include a request to cycle a circuit breaker or check a particular setting or other state of certain equipment. That step may also include a request for feedback. But, in many situations, that first step and any feedback will merely be "input" to subsequent iterations of the VFM system that may or may not eventually result in the same or a related alert.

In this manner, the VFM system generates an iterative sequence of troubleshooting actions over time in an effort to determine the underlying cause of abnormal conditions that gave rise to a set of related alerts and corresponding actions. It is important to emphasize the distinction between this dynamic set of related alert-action pairs (generated iteratively via multiple integrated prediction engines) and a static predetermined manufacturer-supplied procedure (or even a predicted multi-step process).

In one embodiment of the present invention, every subsequent related alert-action pair is dependent upon the one that preceded it, as well as upon the interim changes in the sensor and environmental data. Just as an algorithmic music service only generates a single "next" song at a time, the VFM system typically generates only the "next action" to be performed—because subsequent actions or troubleshooting steps are dependent upon future conditions that typically cannot be predetermined as a practical matter.

As noted above, certain steps are performed entirely by the VFM system, while others are performed by homeowners and may eventually require one or more service calls. Because many problems cannot be addressed adequately without the benefit of time between troubleshooting steps, this process minimizes the need for service calls and makes such service calls, when necessary, far more efficient.

Moreover, the integration of the Homecare Network into the VFM system enables various providers to participate in the troubleshooting process (i.e., "human troubleshooting") long before service calls may become necessary. In many cases, such participation may delay or even prevent service calls that might otherwise have been inevitable. When a service call is required, the technician benefits from prior troubleshooting efforts, even those from other providers that may not even be in the same geographic area.

Finally, it should be reiterated that the VFM system applies the same iterative troubleshooting approach to the "problem" of suboptimal performance. Even if all equipment is operating as expected, the VFM system may detect that the home's "Energy Efficiency" score has fallen below a predefined threshold. Resolving this underlying problem may require a series of different recommended actions implemented iteratively over time until the score returns to an acceptable level (e.g., recalibrating one or more thermostats, replacing an older less efficient water heater and adding solar panels).

The following description will illustrate the architecture and key components of the present invention, as well as the dynamic processes that the VFM system performs over time.

DETAILED DESCRIPTION

Figure 1:
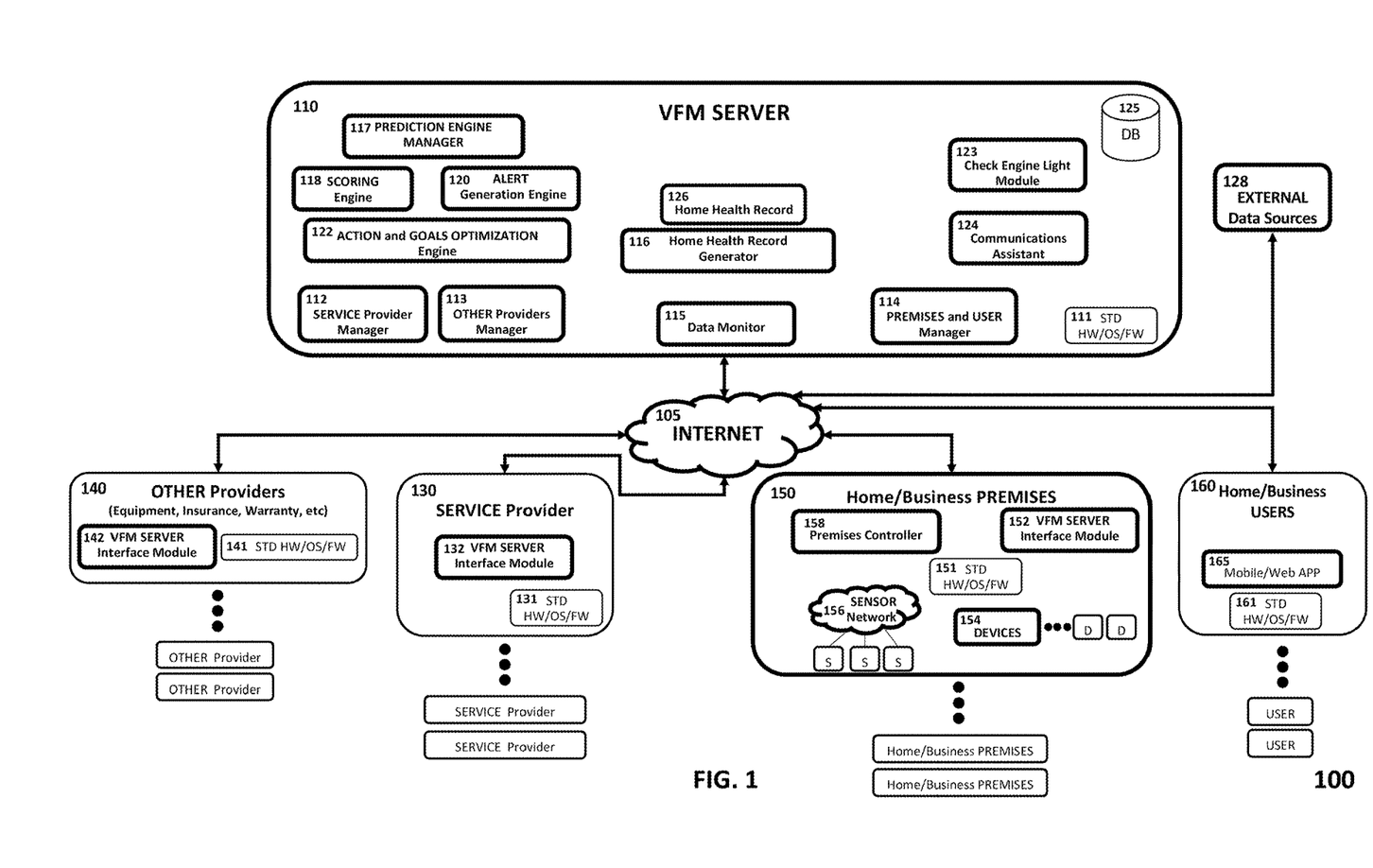
FIG. 1 is a system diagram illustrating an embodiment of the key components of the present invention.

Turning to FIG. 1, the primary functionality of the VFM system 100 is embodied in a VFM Server 110 that communicates over the Internet 105 with integrated networks of (i) providers, including Service Providers 130 and Other Providers 140 (eg, equipment vendors, insurance and warranty providers, etc.) and (ii) users (including homeowners, business owners and other users) from their desktop, laptop and mobile devices 160 and from their Home and Business Premises 150. The VFM system 100 also integrates with External Data Sources 128, for example, to obtain environmental data, such as weather data, as well as air, water and soil quality data and event data (eg, regarding recent earthquakes, floods or disease outbreaks).

VFM Server 110 can be implemented as a single physical server device, as illustrated in FIG. 1 (including standard hardware, firmware and operating system 111), or as multiple interconnected servers (e.g., via Internet 105). Such server functionality can also be implemented, in other embodiments, across one or more physical devices, and by distributing the functionality of modules illustrated in FIG. 1 into a fewer or greater number of modules (including different allocations of hardware and software functionality).

VFM Server 110 further includes Data Monitor 115 (explained in greater detail below) to collect and process data from premises (e.g., sensor data), providers and other external sources, such as External Data Sources 128. Such data (both current and historical) are fed into prediction engines to detect abnormal conditions, generate alerts and corresponding actions on an iterative basis over time.

VFM Server 110 employs Prediction Engine Manager 117 to manage a set of prediction engines to generate alerts and corresponding actions, as described in greater detail below. In one embodiment, these prediction engines include Scoring Engine 118 (to manage scores and subscores representing systemic states of an individual premises, as well as component systems, equipment and infrastructure), Alert Generation Engine 120 (to generate alerts reflecting the occurrence of abnormal conditions) and Action and Goals Optimization Engine 122 (to generate actions corresponding to such alerts in a manner that optimizes user-specified goals).

Once VFM Server 110 generates an alert and corresponding action, a Communications Assistant (i.e., a "Home Assistant") 124 manages the process of communicating alert-action pairs (and related metadata and other summarized historical data from Home Health Record 126—in one embodiment stored in Database 25) to homeowners and/or providers, as discussed below. For example, in one embodiment, Communications Assistant 124 follows up with homeowners to determine whether particular actions were implemented (e.g., changing an air filter). Such information is then updated in the homeowner's Home Health Record 126, and may even be utilized, for example, by providers (service providers, insurance providers, warranty providers, etc.) to offer "credits" for such home maintenance tasks.

While Communications Assistant 124 manages communications to and from VFM Server 110, Check Engine Light Module 123 includes a set of APIs (and corresponding SDKs) that facilitate the creation of third-party applications (such as smartphone apps, or applications on desktop and laptop computers) which integrate and extend the functionality of VFM system 100.

Premises and User Manager 114 manages the common and unique characteristics of various homeowners (and owners of businesses and other types of enterprises) across the Homecare Network. This includes managing the process of acquiring information about the various premises and their owners across the Homecare Network, and leveraging such information to create and manage specific tasks unique to particular premises and/or their owners (as well as other users) via their desktop or laptop computers or mobile devices 160.

In addition to interacting with homeowners, Communications Assistant 124 (with the assistance of various "provider manager" modules) also facilitates interactions with providers in accordance with preconfigured protocols. For example, when a service call is deemed necessary, Communications Assistant 124 and Service Provider Manager 112 (along with Other Providers Manager 113) together manage the process of automatically providing relevant summary data (current alert-action pair, relevant service history, etc.) to specified service providers via the Homecare Network. In one embodiment, service providers are involved even before a service call is deemed necessary, enabling additional troubleshooting input by service providers, which reduces the likelihood of an eventual service call.

As a result, homeowners reduce their out-of-pocket expenses for service calls over time, as well as benefit from increased efficiency and reliability due not only to the early detection of abnormal conditions, but to the corresponding troubleshooting actions designed to address those conditions over time. In short, homeowners experience greater energy efficiency, reliability, safety and extended life of their equipment and other infrastructure.

Moreover, from an operational standpoint, VFM system 100 reduces the overall cost and operational efficiency of the home infrastructure on a systemic basis. For example, VFM Server 110 generates alerts that are not necessarily restricted to an individual item of equipment, but may relate to the performance of a system of equipment (e.g., an HVAC system) that includes multiple items of equipment and infrastructure (e.g., an AC unit, condensate pump, furnace or boiler, ducts, dampers, thermostats, etc.). Corresponding actions may include troubleshooting steps with respect to multiple pieces of equipment and other infrastructure (and components thereof) within that system (or in some cases even outside of a particular system).

Service providers also benefit from this VFM architecture in that they become part of the integrated Homecare Network. For example, service providers in a homeowner's geographic area receive automated leads to many homeowners in that area. By leveraging the opportunity to participate in the troubleshooting process (e.g., receiving detailed relevant data and providing troubleshooting input even before a service call is required), service providers can increase their chances of turning such leads into actual business (as well as be incentivized in other ways to encourage their participation from geographically distant areas).

Moreover, their cost of each "truck roll" can be reduced significantly by virtue of receiving detailed relevant service history in advance of a service call. Many service calls can be avoided, and those that are necessary are more efficient as a result of the service provider's contextual awareness of the recent and historical performance of systems of equipment (even beyond a "suspect" individual item of equipment).

The Homecare Network of VFM system 100 also integrates other types of providers beyond service providers, and aligns their goals with those of particular homeowners. For example, networks of manufacturers, retailers and installers are integrated in a manner that enables the need for new equipment to be interpreted (with the homeowner's permission) as an opportunity to market, sell and install a particular model of equipment.

Such need may be evident, for example, from a recommended alert-action pair, or simply by virtue of the age of the equipment or its performance characteristics over time, alone or in conjunction with a larger system within the home. Homeowners may reach out directly to such integrated providers via the Homecare Network. And the providers may find that their marketing efforts are far more targeted, and thus more effective, in light of their detailed knowledge of the home infrastructure and equipment performance.

An integrated network of warranty providers may, for example, enable a warranty holder (with respect to one or more items of a homeowner's existent equipment) to recommend particular actions for the purpose of avoiding a future warranty claim. Such a company might also offer to renegotiate terms or offer discounts on an extended warranty (e.g., based upon knowledge of a homeowner's diligent maintenance practices and historical operational performance).

Other warranty companies not currently affiliated with the homeowner may (based on current and historical performance data regarding the homeowner's equipment and infrastructure) market new or replacement warranties to the homeowner. In this manner, both the warranty companies and the homeowner benefit from a competitive market that is far more targeted to homeowners "in need" but not necessarily "in distress."

Similarly, VFM system 100 integrates a network of insurance companies (with or without an existing relationship to the homeowner) that can leverage this targeted knowledge about homeowners' equipment and infrastructure to offer competitive policy rates (including group rates across other homes within the network). Homeowners can also leverage their "preemptive maintenance" history to shop around for more competitive rates directly from insurance companies with an intimate knowledge of certain risks associated with their home's infrastructure.

One particularly valuable provider network includes multi-residence institutional owners who desire to reduce the costs of maintaining the equipment and infrastructure across their various properties. Instead of relying on manually managing multiple property managers across various geographic locations, such institutional providers can instead leverage the "networked property management" features of VFM system 100 via the Homecare Network.

Moreover, these institutional owners can leverage their "volume" purchasing and maintenance power with respect to equipment and infrastructure across such properties to offer their homeowners significant savings and convenience. Not only will homeowners benefit, but service (and other) providers will also benefit from access to these large multi-residence markets.

Such efforts may ultimately move the market further in the direction of an "Equipment-as-a-Service" ("EaaS") model, in which homeowners lease some or all of their equipment and infrastructure for a monthly (possibly consumption-based) fee that includes service, upgrades and replacement costs, as well as valuable premium discounts on certain items. Under this model, homeowners enjoy the benefits of regular "home maintenance" payments, while avoiding concerns about expensive unexpected and intermittent repair and replacement costs. Yet institutional owners will still have incentives to proactively maintain the equipment and infrastructure across their properties, as such proactive maintenance will reduce their costs over time.

It will be apparent to those skilled in the art that a variety of other integrated provider networks will provide similar benefits (as compared to the Homecare Network) to homeowners and providers alike. In each instance, the integrated providers benefit from access to a very targeted market of homeowners based on the detailed current and historical service and related data provided by VFM system 100. Homeowners similarly benefit from the reduced costs afforded by a "volume purchase" environment, in addition to the convenience and access to targeted experts that are "up to speed" with the state of their home equipment and infrastructure. In short, the Homecare Network of VFM system 100 provides an integrated mechanism to align the goals of homeowners with those of various provider networks.

In one embodiment, Home Health Record 126 includes static as well as dynamic information. For example, it contains the home's geographic location and identification of installed equipment and infrastructure, including its location (e.g., room or more precise position) within the home. It also includes user profile information, such as an occupant's ability and/or desire to perform certain troubleshooting tasks themselves.

The Home Health Record 126 further includes operational models, performance characteristics and specifications (in certain cases specific to the home's geographic location and environment) for each installed item of equipment, as well as for comparable units, such as those that are newer and more energy-efficient and others that may be smaller or larger alternatives from a systemic perspective. In one embodiment, Home Health Record 126 includes information regarding home infrastructure that is not specific to any item of equipment, such as the thermal rating of windows.

Dynamic information includes the age of each item of equipment, warranty information and service history (including identification of service providers). Moreover, the dynamic history of the home includes metadata relating to prior alerts and actions, as well as timestamped raw and/or processed sensor and external environmental data.

In one embodiment (discussed below), Home Health Record 126 also includes scores reflecting the systemic state of the home itself (as well as sub-scores reflecting equipment systems and individual units or devices). For example, a Reliability score might reflect an overall current state of the reliability of the home (taking into account the reliability over time of individual pieces of equipment). In this embodiment, trendlines of these scores (and sub-scores) are also included in Home Health Record 126.

Home Health Record Generator 116 creates and maintains Home Health Record 126 as certain information dynamically changes over time. For example, whenever a new homeowner is added to VFM system 100, Home Health Record Generator 116 creates entries for the various static information relating to that homeowner's residence (e.g., user profile data, geographic data, equipment and infrastructure and related operational data, etc.). Moreover, as dynamic sensor data is received and processed over time, Home Health Record Generator 116 stores and updates Home Health Record 126 to reflect such dynamic data, including alerts, actions and other related data for access by users, providers and various components of VFM system 100.

In addition to integrating VFM Server 110 with Service Provider 130 and Other Provider 140 networks, the Homecare Network also integrates the premises 150 of homeowners and owners of business and other entities. In this manner, VFM system 100 monitors the changes that occur over time to the infrastructure and equipment within those premises 150, detects abnormal conditions and generates related alert-action pairs in an effort to address those abnormal conditions over time (e.g., iteratively troubleshooting the root cause of underlying problems and providing proactive longer-term home maintenance solutions).

At a typical homeowner's premises 150, VFM system 100 includes a Sensor Network 156 to monitor the various equipment and infrastructure installed in the home, such as Devices 154 in various locations throughout premises 150. It should be emphasized that individual sensors do not necessarily bear a one-to-one relationship with each item of equipment. For example, a leak detection sensor may be placed strategically at or near a pipe valve interconnecting multiple pieces of equipment. Moreover, temperature sensors may be placed in a particular area to ensure that excessive heat (or cold) does not negatively impact the operation of nearby equipment. While the permutations are infinite, it is important to note that Sensor Network 156 provides continuous data that may only indirectly relate to particular equipment.

Moreover, the placement of such sensors is of particular importance. In one embodiment, information about the precise location of each sensor (relative to nearby equipment and its room and home environment) is stored in Home Health Record 126 and utilized in the process of predicting alerts and corresponding actions. A potential action may also include the addition, removal or relocation of one or more sensors.

In one embodiment, an on-site Premises Controller 158 filters and processes data from Sensor Network 156 before delivering it over the Internet 105 to VFM Server 110. Premises Controller 158 filters such data in part to address the impracticality of sending to VFM Server 110 the entirety of the raw data generated by every sensor.

Sensors may well vary in how frequently they generate raw data and how frequently they are sampled. Premises Controller 158 effectively "normalizes" this variability across different sensors through the filtering process, in which data for certain types of sensors are more significantly filtered than for other sensors (depending, for example, on the likely rate of change of such raw data over time).

Moreover, Premises Controller 158 also normalizes the units of raw data among various sensors through a conversion process. As a result, the converted data sent by Premises Controller 158 to VFM Server 110 can be meaningfully compared across different sensors (e.g. to determine relative statistically significant changes over time).

In one embodiment, the frequency and granularity of monitored data (as well as the schedule for delivery of such data to VFM Server 110) is adjustable based upon actions (i.e., commands) from VFM Server 110. For example, to diagnose a potential abnormal event, VFM Server 110 may invoke Premises Controller 158 to automatically adjust the frequency and/or granularity of monitored data to gather more information to facilitate the prediction of further alerts and/or corresponding actions.

Communication with VFM Server 110 is managed by VFM Server Interface Module 152, which communicates with Communications Assistant 124 on VFM Server 110 via Internet 105. Premises Controller 150 and VFM Server Interface Module 152 may be implemented on a standard desktop or laptop computer (along with standard hardware, firmware and operating system 151) or, in other embodiments, on a smartphone or as separate physical standard or custom hardware devices.

Homeowners (and owners of businesses and other types of premises) can also access VFM Server 110 via a voice-enabled and/or web browser interface or custom app 165 on their devices 160, such as mobile devices, or through similar interfaces via their laptop or desktop computers (each of which typically includes standard hardware, firmware and operating system 161).

In this manner, homeowners receive alerts and corresponding actions, as well as provide feedback (e.g., requested information) or initiate queries. For example, a homeowner can submit a voice query regarding the relative efficiency of their AC system within a specified timeframe, and receive a summary of historic performance levels, as well as targeted comparative recommendations for upgrades or replacements that will be more efficient from the perspective of their AC system, as well as any individual item of equipment.

Another key component of the architecture of VFM system 100 (alluded to above) is the Homecare Network that integrates the homeowner network with networks of various service and other providers. Each Service Provider system 130 includes (in addition to standard hardware, firmware and operating system 131) a VFM Server Interface Module 132 (e.g., embodied in the provider's physical server, whether on-premises or in the cloud) that interacts with corresponding Service Provider Manager 112 functionality in VFM Server 110. In other embodiments, Service Provider system 130 may be implemented as one or more physical desktop or laptop servers (and/or mobile or customized hardware or software devices).

Similarly, Other Provider systems 140 (e.g., owned by equipment vendors, insurance or warranty companies, etc.) also include standard hardware, firmware and operating system 141, along with a VFM Server Interface Module 142.

The VFM Server Interface Module 132 or 142 in each provider's server communicates with the Service Provider Manager 112 or Other Provider Manager 113 in VFM Server 110. It receives and analyzes data from VFM Server 110 (such as periodic data derived from Home Health Record 126 summarizing the state of each homeowner's equipment and infrastructure) and provides feedback, such as recommended actions regarding a recent alert, discount service and upgrade offers, etc. Such data can be analogized to a "carfax" report with respect to the state of a homeowner's equipment and infrastructure over time.

In addition to the advantages of repeat business and upsell opportunities, this architecture enables benefits such as "just-in-time" service calls (e.g., based on knowledge of the state of a homeowner's equipment) and better overall matching of specific needs of homeowners with providers having relevant expertise. A service provider might, for example, combine a just-in-time service call with an upcoming maintenance task. In one embodiment, custom APIs facilitate more efficient and complex functionality, such as detailed "just-in-time" scheduling, troubleshooting actions with immediate feedback to the provider, etc.

In other embodiments, VFM Server 110 matches the "supply" of providers with the "demand" of a network of properties (including institutional owners of multiple properties). For example, VFM Server 110 can leverage its knowledge of the availability of a particular service provider's schedule and the need for relevant service by multiple homeowners within a particular geographic area (each of whom has received an outstanding action calling for such service within a month). As a result, both homeowners and providers benefit from the enhanced efficiency afforded by this "integrated scheduling" functionality.

As noted above, VFM system 100 functional modules depicted in FIG. 1 can be implemented in hardware, software and combinations thereof, and such functionality can be divided into sub-modules or combined together across one or more physical servers in accordance with design and engineering tradeoffs by those skilled in the art without departing from the spirit of the present invention.

Moreover, to the extent that functional modules within VFM Server 110 (or those included in Premises Controller 158 or in provider or other external servers) are implemented in software, such software is embodied in physical non-transitory computer-accessible storage media (i.e., memory) from which it is invoked for execution by one or more CPUs or other physical processing units.

As noted above, Premises Controller 158 continuously processes raw data from the sensors via local sensor network 156 at the premises 150. After filtering and converting this raw data as described above, Premises Controller 158 streams this processed sensor data to Data Monitor 115 in VFM Server 110.

Data Monitor 115 also receives environmental and other external data from a variety of external data sources 128. For example, local weather forecasts provide valuable input that affect predictions of abnormal conditions. Current heavy rain might explain why elevated sump pump usage is not abnormal, while a storm warning might result in preventive charging of batteries in a solar system. Other external environmental data can include air, water and soil quality, as well as major nearby events, such as an earthquake, flood or infectious disease outbreak or pandemic.

Data Monitor 115 parses this sensor-based and environmental data for each home, and processes and formats the data for input to the prediction engines. It should be noted that the processed data provided to the prediction engines includes timestamped current and historical raw data (in one embodiment), as well as data that have been filtered and converted by Premises Controller 158.

Such information enables the prediction engines to infer proactively various states of the equipment, systems and infrastructure of the home. For example, is a unit of equipment (or a component thereof) wearing more rapidly than normal, or nearing the end of its useful life? Is a unit of equipment or a system (e.g., an HVAC system) operating more or less efficiently than normal? These and other current or prospective operational states can be inferred from this raw or processed data.

In addition to this processed current and historical sensor and environmental data, additional information from Home Health Record 126 is extracted for use by the prediction engines. For example, historical alert and corresponding action data is extracted as well, including metadata from such alerts and actions, such as timestamps, types or categories and various other attributes (discussed in greater detail below).

Such inputs further include the home's geographic location and identification of installed equipment and infrastructure, including its location (e.g., room or more precise position) within the home, as well as its age, warranty information and service history (including service provider info). Also included are operational models, performance characteristics and specifications of installed equipment and comparable units, as well as user profile information (e.g., reflecting particular occupants' desire and ability to perform certain levels of troubleshooting). In one embodiment, data across multiple properties are provided as input to enable the prediction engines to consider "inter-property" factors such as shared risks and pooled resources, comparative performance benchmarks, etc.

It will be apparent to those skilled in the art that a variety of other types of information (whether from sensors, external data sources or elsewhere) can be included in Home Health Record 126 and provided as inputs to the prediction engines without departing from the spirit of the present invention. Once Data Monitor 158 has completed the parsing, formatting and other processing of this data, Home Health Record 126 is updated with this newly processed data, which are provided to the prediction engines.

Before discussing the prediction engines, it is helpful to consider an overview of the dynamic aspects of the iterative process by which the key components of VFM system 100 work together to process raw data over time, feed such data (both current and historical) into prediction engines to detect abnormal conditions, and generate alerts and corresponding actions designed to address the root cause of underlying problems of which such abnormal conditions are often mere symptoms.

Figure 2:
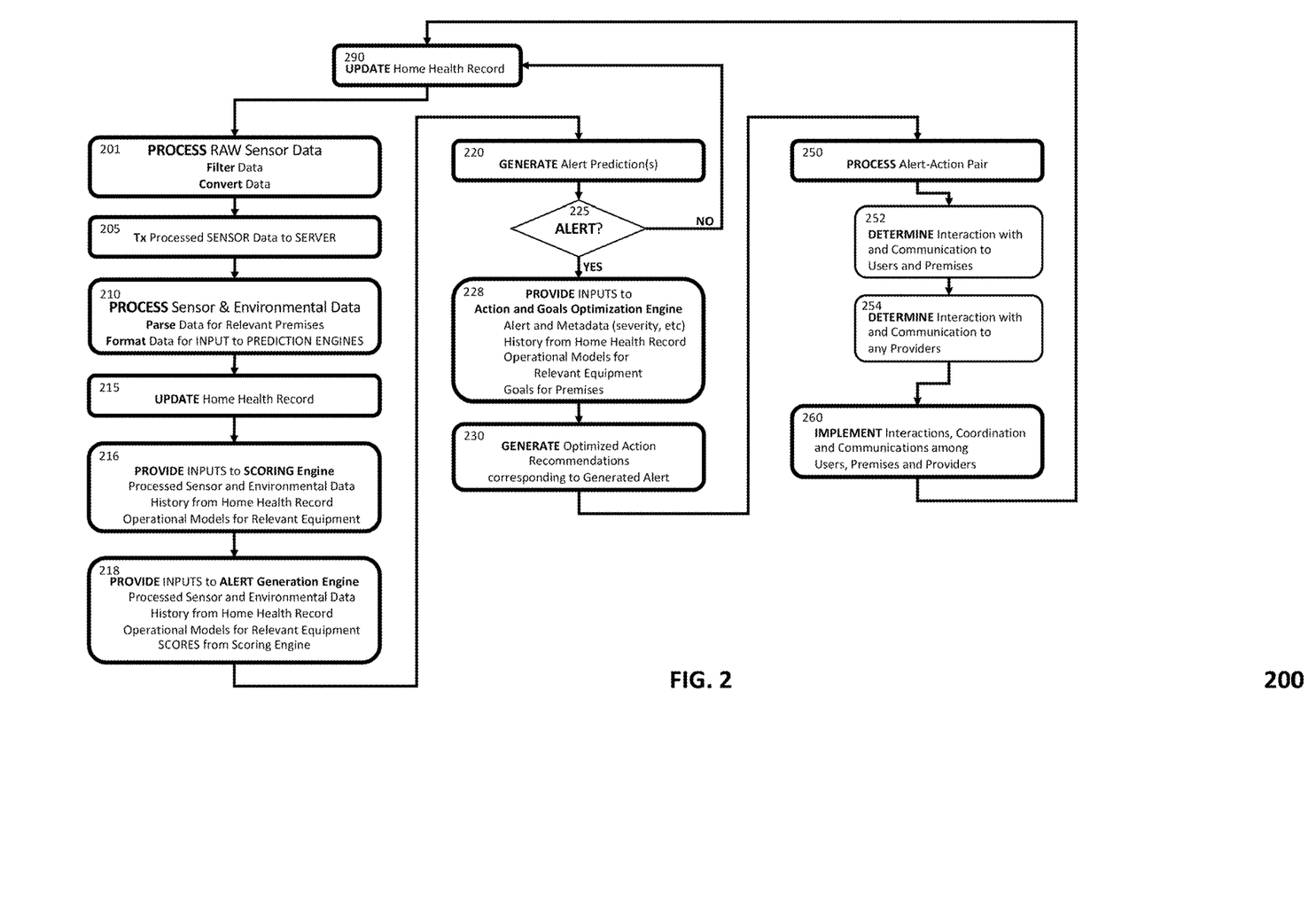
FIG. 2 is a flowchart illustrating an embodiment of the key steps of a dynamic process by which the present invention maintains the health of the equipment and infrastructure of one or more properties.

Turning to FIG. 2, flowchart 200 illustrates one embodiment of such a continuous process. While flowchart 200 focuses on the process within a particular premises 150, it should be noted that VFM Server 110 manages multiple different premises 150 simultaneously. In certain scenarios, this enables cross-premise synergy, such as a provider coordinating multiple service calls based on similar alerts or other problems across premises 150 within its service area.

Beginning with step 201, the sensors in sensor network 156 capture raw sensor data as air, water, soil and other sensors detect changes over time. Premises Controller 158 filters, converts and otherwise processes such data (as discussed above) and, in step 205, transmits such processed sensor data to Data Monitor 115 in VFM Server 110.

In step 210, Data Monitor 115 further processes such sensor data, along with historical data from Home Health Record 126 and environmental data (e.g., from External Data Sources 128), and parses such data into a format suitable for input to the prediction engines. In step 215, Data Monitor 115, in conjunction with Home Health Record Generator 116, updates Home Health Record 126 to reflect the new data since the prior iteration of this process 200.

In step 216, Data Monitor 115, in conjunction with Prediction Engine Manager 117, provides such inputs to Scoring Engine 118 (the functionality of which is described in greater detail below), which updates relevant scores (home reliability, home efficiency, fire risk, etc.). Though not shown, Home Health Record 126 is updated to reflect these revised scores.

In one embodiment, Prediction Engine Manager 117, in step 216, provides the same inputs, along with these updated scores, to Alert Generation Engine 120, which, if it detects an abnormal condition, generates (in step 220) an alert with associated attributes, as is also discussed in greater detail below. In step 225, Prediction Engine Manager 117 determines whether the predicted alert should be issued as an alert requiring an associated action. If not, Home Health Record 126 is updated in step 290, and the process returns to step 201 to process raw sensor data during the next iteration of process 200.

Otherwise, the alert is processed by Prediction Engine Manager 117, which (in one embodiment shown in step 228) provides the predicted alert and associated attributes, along with the scores and other input data from Home Health Record 126, to Action and Goals Optimization Engine 122. In step 230, Action and Goals Optimization Engine 122 generates an action (i.e., the next recommended troubleshooting step, as discussed in greater detail below) that corresponds to the current alert (thus creating a current alert-action pair) and is optimized in accordance with a homeowner's predefined user goals.

In step 250, Prediction Engine Manager 117 processes the current alert-action pair (e.g., to implement that next recommended troubleshooting step) which, in one embodiment, involves coordination with Communications Assistant 124 and Premises and User Manager 114 (among other modules of VFM Server 110) to determine, in step 252, the interaction with and communication to the relevant premises 150 and associated users 160. For example, a recommended action may be determined to require communication to a homeowner to implement that action. In another embodiment, such action may be performed automatically by Premises Controller 158.

Similarly, in step 254, Prediction Engine Manager 117 coordinates with Communications Assistant 124 and Service Provider Manager 112 and Other Providers Manager 113 (among other modules of VFM Server 110) to determine the interaction and communication with any relevant Service Provider 130 or Other Provider 140. For example, a recommended action may be performed entirely or in part by a provider (e.g., scheduling a service call). In another embodiment, a relevant provider may supplement the recommended action with additional feedback.

Finally, in step 260, the recommend action is coordinated, communicated to and implemented by the relevant parties, such as providers, users and automated functionality built into Premises Controller 158. At that point, Home Health Record 126 is updated in step 290, and the process returns to step 201 to process raw sensor data during the next iteration of process 200. In one embodiment, the results of such implementation are incorporated into the update of Home Health Record 126. For example, a homeowner might provide feedback indicating whether or not the action resolved the current alert (i.e., symptom of an underlying problem).

Figure 3A:
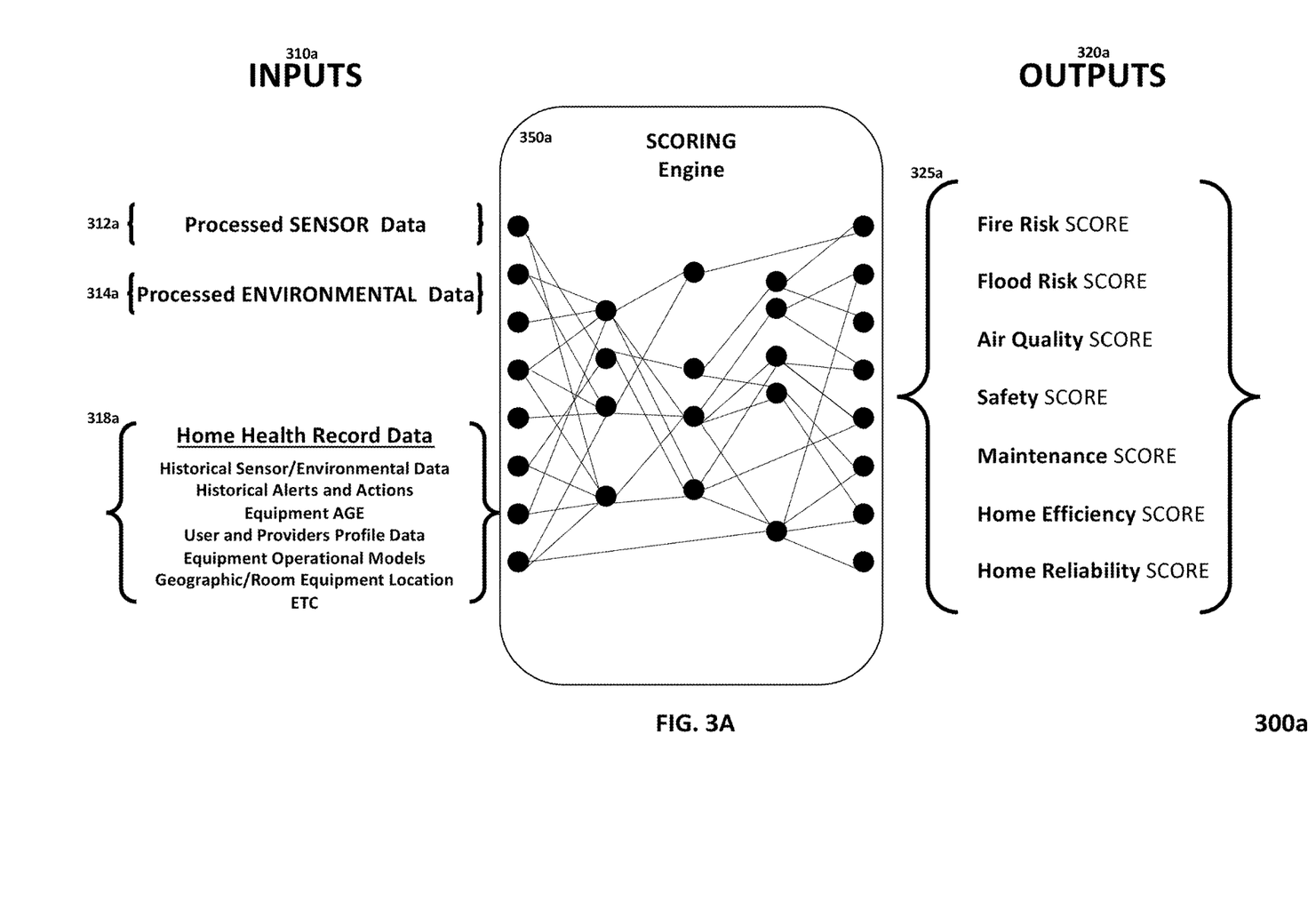
FIG. 3A is an architectural diagram illustrating an embodiment of a neural network implementation of a scoring engine of the present invention, including key inputs and outputs.
Figure 3B:
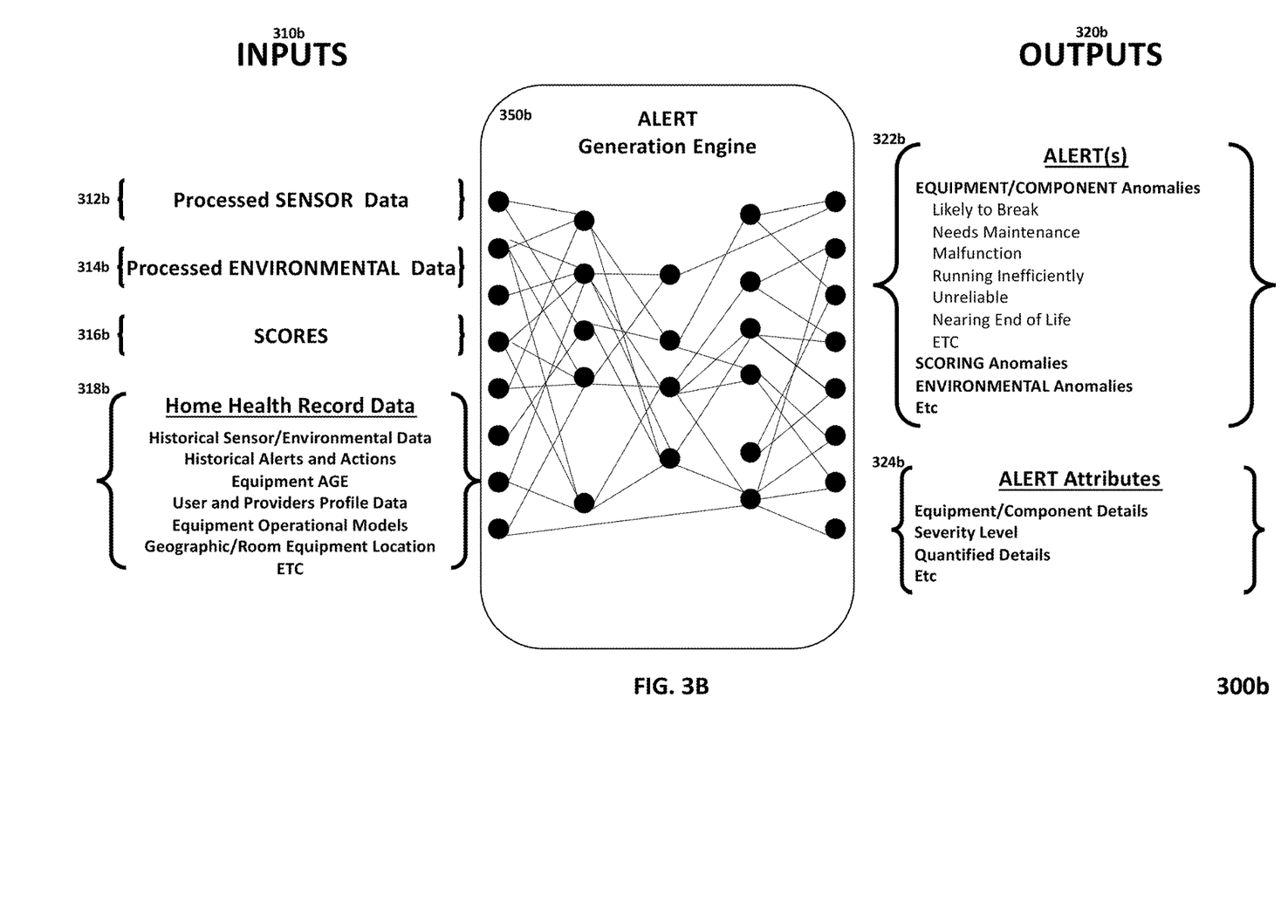
FIG. 3B is an architectural diagram illustrating an embodiment of a neural network implementation of an alert generation engine of the present invention, including key inputs and outputs.
Figure 3C:
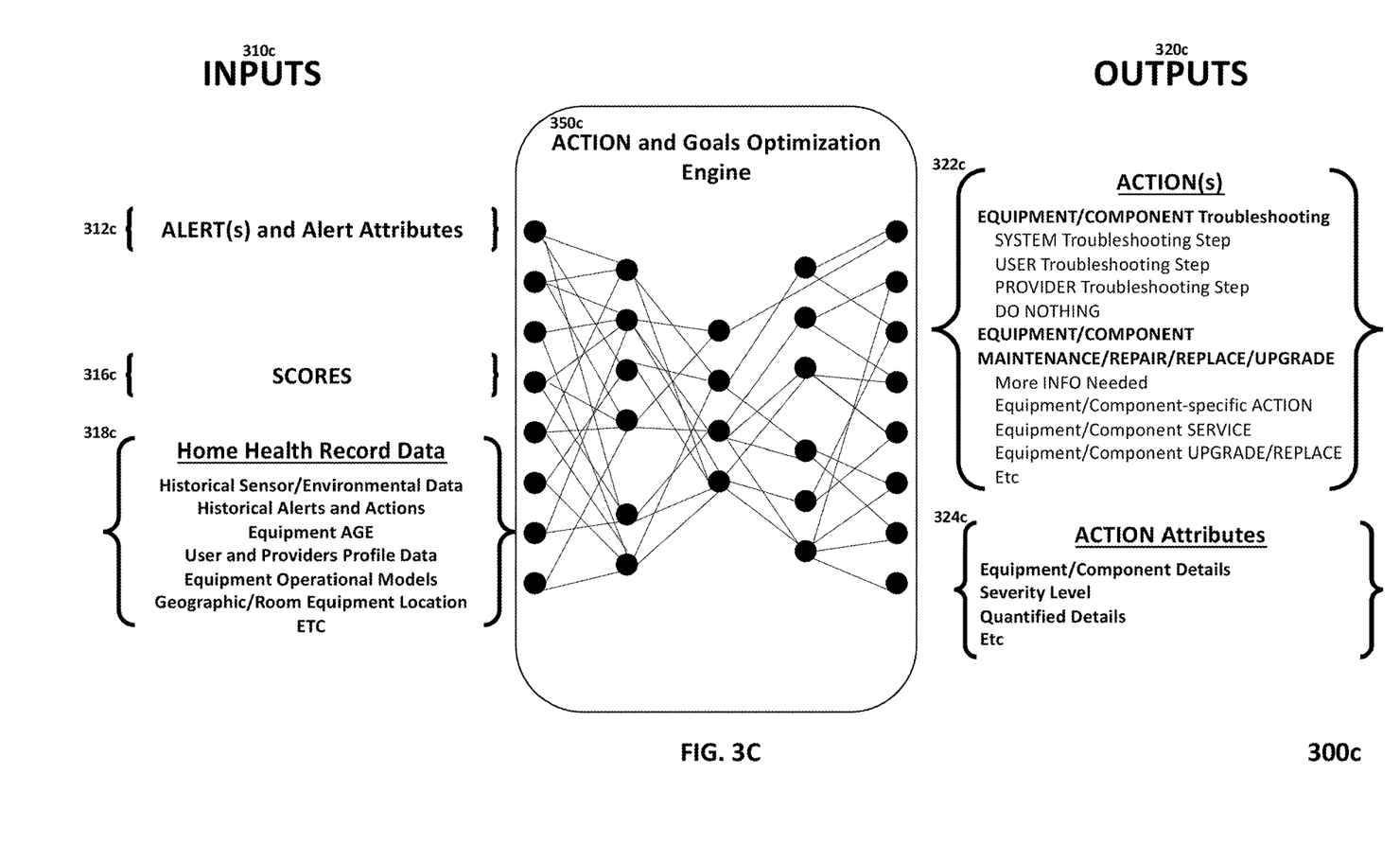
FIG. 3C is an architectural diagram illustrating an embodiment of a neural network implementation of an action and goals optimization engine of the present invention, including key inputs and outputs.

Turning to FIGS. 3A, 3B and 3C, the functionality of one embodiment of the prediction engines is now described. VFM Server 110 integrates three distinct prediction engines (Scoring Engine 118, Alert Generation Engine 120 and Action and Goals Optimization Engine 122), each of which is implemented as a machine-learning-based neural network that employs predictive techniques to assess likely outcomes. In other words, given a large set of inputs, the combination of which has very likely not been encountered before, each of these prediction engines assesses and "predicts" the most probable outcomes.

In alternative embodiments, the prediction engines are implemented with different forms of unsupervised machine learning, statistical analytics, rules-based heuristics and other techniques (or combinations thereof). In such embodiments, the prediction engines still generate similar outputs in response to similar inputs (as compared with their machine-learning neural network counterparts) without departing from the spirit of the present invention.

In one embodiment, the inputs described above are provided to the prediction engines on an iterative basis. In other words, on a very frequent basis (e.g., once per second), the inputs are provided to the prediction engines, which ultimately may yield a predicted alert and optimized action. During most iterations, insufficient changes have occurred to generate an alert. Once an alert is generated, a corresponding action (optimized for predefined User Goals) is generated and then implemented. One embodiment of these prediction engines is described below.

Illustrated in diagram 300a of FIG. 3A, Scoring Engine 350a utilizes a set of inputs 310a (discussed above) to generate a set of outputs 320a representing the most probable assessment of the state of certain higher-level (e.g., whole-home) conditions and risks. For example, in one embodiment, it generates scores 325a for overall "Home Efficiency," "Home Reliability," "Safety," "Maintenance" (e.g., how well a home has been maintained over time), "Fire Risk," "Flood Risk" and "Air Quality." All of these scores 325a facilitate the generation of alerts and actions by the other prediction engines.

For example, a relatively low Home Efficiency score may tip the balance in generating an alert with respect to otherwise borderline efficiency data regarding particular equipment or systems. Similarly, the predicted action corresponding to that alert might be one that would not have been generated had the Home Efficiency score been higher (such as a particular adjustment of settings, an upgrade to a more efficient model or even the addition or replacement of particular equipment or modification of the home's infrastructure over time until the Home Efficiency score increases sufficiently).

In one embodiment, Scoring Engine 350a generates sub-scores (e.g., for the reliability of an individual item of equipment) in the process of generating a score 325a reflecting the state of the home. These sub-scores are also maintained in Home Health Record 126.

Scoring Engine 350a generates outputs 325a that reflect system-wide and, in particular, whole-home perspectives based on various aspects of current and historical sensor data regarding one or more items of equipment and infrastructure, as well as external environmental data. For example, the reliability of an individual item of equipment may be impacted by its age, prior alerts and corrective actions, repairs, etc. Yet, Scoring Engine 350a will also take into account the reliability of other equipment over time.

Based upon its training, Scoring Engine 350a may effectively prioritize one item of equipment over another (e.g., by assigning different weights to different equipment types), or prioritize based on a system's operational reliability curve or various other factors. Such weighting or prioritization is implemented as an integral part of the Scoring Engine's 350a machine-learning architecture, as opposed to employing a simple weighted average or other predetermined function.

In one embodiment, Scoring Engine 350a is trained with sample sets of inputs yielding a known resulting output score 325a (such as a Fire Risk score, for example, of 85 on a scale of 1 to 100). These sample inputs include current processed sensor data 312a (described above), current processed environmental data 314a (such as weather data from External Data Sources 128), and various data 318a stored in Home Health Record 126 (including, in one embodiment, historical sensor and environmental data, historical issued alerts and corresponding actions, a list of equipment with its room location, operational models and current age, and profile data relating to users and providers).

As a result of such training, Scoring Engine 350a becomes sufficiently proficient at predicting changes in output scores 325a when presented with current and historical values of this set of inputs 310a that it has never encountered before. Upon each iteration of VFM system 100, Scoring Engine 350a predicts changes (if any) in these output scores 325a based upon changes in the values of the inputs 310a that have occurred since the prior iteration.

Turning to FIG. 3B, diagram 300b illustrates how, in one embodiment, Alert Generation Engine 350b utilizes a set of inputs 310b (in this embodiment, the same set of inputs provided to Scoring Engine 350a, along with the scores generated by Scoring Engine 350a, to generate a set of outputs 320b reflecting one or more alerts 322b and associated attributes 324b. Inputs 310b include current processed sensor data 312b, current processed environmental data 314b, historical data 318b from Home Health Record 126 (as described above) and the output scores 316b generated by Scoring Engine 350a.

Alert Generation Engine 350b generates predictions regarding the likely existence of emerging system risks—i.e., abnormal conditions. Such abnormal conditions include "scoring anomalies" in which a particular sub-score or score (e.g., a significantly low Home Efficiency score), in the context of the other inputs, suggests a need for corrective action. As will be discussed below, such corrective action could be adjustment of the settings of particular equipment or, in more severe cases, addition of certain equipment or replacement of a particular unit with a newer more efficient model.

Other abnormal conditions include "environmental anomalies." in which environmental data suggest the need for preventive actions. For example, in the event of a severe storm warning within proximity to a homeowner's premises, Alert Generation Engine 350b might generate (taking into account the context of the other inputs 310b) a preventive action such as testing the operation of a sump pump.

A primary function of Alert Generation Engine 350b is to generate alerts 322b representing "equipment anomalies" that relate to particular equipment or components thereof (or more abstract systemic anomalies at a system or whole-home level). For example, did a particular item of equipment (or component, or system comprising multiple items of equipment) experience a "malfunction?" Or is it "unreliable" or "running inefficiently" over a sufficient period of time? Is it "likely to break" based upon its past performance characteristics, or "nearing the end of its life?" Or is it currently "in need of maintenance?"

These and other types of alerts 322b represent outputs 320b of Alert Generation Engine 350b that constitute abnormal conditions reflecting "equipment anomalies." As noted above, during most iterations of Alert Generation Engine 350b, no alert will be generated. In other words, all systems and individual units of equipment within the home (or even across a network of homes) are operating within "normal operational ranges" and "acceptable risk levels"—at least based upon current sensor data.

But, at some point in time (e.g., when sensor data or environmental data changes sufficiently from the prior iteration), Alert Generation Engine 350b will, during the current iteration, detect an abnormal condition and issue an alert 322b. In addition to generating the alert itself, Alert Generation Engine 350b also generates certain related "alert attributes" 324b.

For example, in one embodiment, the alert attributes 324b identify the particular item of equipment (or component thereof, or higher-level system) to which the alert 322b applies. They further include various "quantified details" relating to such equipment and components, such as a particular temperature or other setting that may relate to the anomaly.

Finally, the alert attributes 324b include a "severity level" indicating the relative significance of the alert 322b. As many alerts are effectively contextual alerts, the severity level often reflects a contextual awareness of the state of the home or equipment system (beyond the state of an individual piece of equipment or component thereof). For example, a problem with an air conditioning unit might increase in severity during a heat wave in the area.

Some alerts 322b are relatively minor and might, for example, result in the automatic adjustment of equipment settings by VFM Server 110, or may require user intervention, but not imminently. Other alerts 322b may require more immediate attention, or may potentially result in more severe problems, even if they do not require immediate attention. The number of different severity levels is the result of design and engineering tradeoffs that will be apparent to one skilled in the art without departing from the spirit of the present invention.

It should be noted that the placement of sensors within a room or area of the home (or within proximity of particular items of equipment or infrastructure) can be very important to the relative accuracy of the sensor data with regard to its desired purpose. In one embodiment, the precise location of each sensor is stored in Home Health Record 126 and used by Alert Generation Engine 350b in the process of generating alerts 322b. In another embodiment, an alert 322b may include "improper placement" of a sensor, which ultimately may result in an action (generated by Action and Goals Optimization Engine 350c) recommending a better location.

As alluded to above, alerts 322b are often contextual in nature. For example, as discussed earlier, Alert Generation Engine 350b might detect abnormally high sump pump activity, but not generate an alert due to the contextual environmental data that such activity has occurred during a period of heavy rain. In other contexts, a forecast of heavy rain might result in the generation of an alert 322b with respect to the sump pump due to its erratic behavior during prior periods of heavy rain, along with the fact that it has not serviced in the interim.

In one embodiment, users may initiate queries to VFM Server 110 (e.g., from a voice-enabled mobile app or web browser interface 165 on a laptop or desktop computer). For example, as noted above, a user might submit a query regarding the relative efficiency of their AC system. Such a query would effectively trigger an alert and related metadata regarding the subject of the alert (e.g., the AC system). In this scenario, Action and Goals Optimization Engine 350c would generate a "response" action including, for example, a summary of the efficiency of the installed AC system (based upon its historic performance) and perhaps a comparative recommendation for an upgrade to a more efficient competitive alternative product.

Providers may also initiate queries to VFM Server 110. For example, a warranty provider may (with a homeowner's permission) initiate queries regarding the homeowner's maintenance history. As a result of a query returning favorable information regarding the homeowner's maintenance record, the warranty provider might offer the homeowner a discount on an extended warranty.

In the event Alert Generation Engine 350a fails to generate an alert (as is likely to be the case during most iterations), then Home Health Record 126 is updated and VFM system 100 repeats the process for the next iteration (i.e., receiving sensor data from Premises Controller 158 of each home, etc.). When an alert 322b is generated, the alert 322b and its associated alert attributes 324b, along with many of the same inputs provided to Alert Generation Engine 350a, are provided as inputs to Action and Goals Optimization Engine 350c.

Turning to FIG. 3C, diagram 300c illustrates how, in one embodiment, Action and Goals Optimization Engine 350c utilizes these inputs 310c (in this embodiment, including alerts and alert attributes 312c, scores 316c generated by Scoring Engine 350a and the same data 318c stored in Home Health Record 126 and provided to the other prediction engines) to generate a set of outputs 320c representing recommended actions 322c and corresponding action attributes 324c.

It is important to emphasize that the actions 322c generated by Action and Goals Optimization Engine 350c are not designed merely to address the associated alert 322b—i.e., the "symptom" of the problem that may be resolved relatively easily in the course of one iteration, or may require a more complex series of actions not yet fully determined. Rather, each action 322c generated by Action and Goals Optimization Engine 350c is the "next action" to be performed—i.e., the next step in a dynamic iterative troubleshooting process.

In other words, follow-on actions (determined during subsequent iterations) cannot necessarily be determined without additional information, such as the results of the current action 322c, user and/or provider feedback and the changes that occur in sensor and environmental data over time. It is this dynamic feedback approach, often involving more than one related alert-action pair, that provides a meaningful simulation of the ideal Virtual Facilities Manager.

Moreover, it should be noted that related alert-action pairs need not involve the same alert. In many cases, a different alert will be generated during subsequent alerts, although its associated action may relate to the same underlying problem. This process effectively diagnoses, as well as addresses, that underlying problem (with timely assistance from homeowners and providers), as shown in the scenarios discussed below.

In one embodiment, Action and Goals Optimization Engine 350c does more than predict the next action that best corresponds with the current alert (in the context of the other inputs, including current and historical data, operational models, etc.). It also takes into account various User Goals to determine which of various potentially relevant actions optimally furthers one or more of these User Goals.

For example, one homeowner may want to optimize for lowest cost, while another might want to optimize for highest energy efficiency. Still others might choose to optimize for least inconvenience regarding service calls and homeowner involvement, or greatest reliability or safety. Various other User Goals will be apparent to those skilled in the art.

The User Goals are not considered merely at the level of an individual item of equipment, but at a higher system or whole-home level (or even across a network of homes). For example, the cost of replacing (as opposed to repairing) a relatively expensive component of a piece of equipment may still outweigh the projected cost of a more expensive future replacement of the entire unit (or of other interdependent equipment in the same system). Action and Goals Optimization Engine 350c performs these comparative analyses based upon operational models and related financial and other data provided as inputs.

Action and Goals Optimization Engine 350c also takes into account systemic considerations when looking at particular equipment to recommend. For example, additional "smart control" devices may be recommended to provide a homeowner with more control over the operational parameters of certain equipment, enabling the homeowner with a greater ability to satisfy an energy efficiency User Goal.

Moreover, in another embodiment, homeowners can specify an ordered priority of combinations of these User Goals, as well as a weighted "optimization function" that has multiple User Goals as parameters. For example, a user might prioritize lowest cost, but with a minimal level of energy efficiency.

As a result of these specified User Goals, Action and Goals Optimization Engine 350c effectively selects, from among a domain of potential actions exceeding a threshold of correlation to the current alert (in the context of relevant historical data), the particular action that most optimally satisfies the User Goals (or function thereof). In short, all other factors being equal, the generated action might differ depending upon a particular homeowner's User Goals.

It should be noted that, while these User Goals provide homeowners with the advantage of some degree of control over the maintenance of their premises, they also provide advantages to providers. For example, homeowners focused on energy efficiency are far more targeted customers for upgrades to more energy efficient models than typical homeowners. In general, the better a homeowner's needs and desires can be matched to the particular products and services offered by certain providers, the more likely a "win-win" outcome can be achieved.

In one embodiment, Action and Goals Optimization Engine 350c employs the scores 325a generated by Scoring Engine 350a (among other inputs) to generate actions 322c that facilitate these "win-win" outcomes between homeowners and various providers. For example, the integration of Home Efficiency scores enables "energy utility" providers to better manage energy usage by homeowners (e.g., by offering discounts for lower Home Efficiency scores over time). Similarly, Maintenance scores enable Warranty providers to incentivize more proactive preventive maintenance behavior over time. And Home Reliability scores enable Insurance providers to make much more targeted risk assessments, such as discounts for higher Home Reliability scores over time.

In the embodiment illustrated in FIG. 3C, Action and Goals Optimization Engine 350c generates various different types of actions 322c. For example, many such actions 322c relate to troubleshooting steps regarding operational malfunctions of an individual unit of equipment or one or more of its components. An action might involve adjusting a setting, reporting status data that is not available via a sensor, flipping a switch, describing a sound and many other actions designed to yield feedback that will inform subsequent troubleshooting steps.

Moreover, certain actions 322c will be performed directly by VFM Server 110 (e.g., over the Internet 105, via Premises Controller 158 or otherwise). Other actions include steps to be taken by the homeowner, including performing actions and/or providing information. Still others may require the intervention of a service provider (including automated notification of the service provider, scheduling, etc.). And certain actions will simply involve waiting for a subsequent alert (e.g., waiting a period of time before determining the next step due to interim changes in sensor and/or environmental data).

Other actions 322c may relate less to troubleshooting and fixing a discrete problem and more to ongoing preventive maintenance tasks. Here too, certain maintenance tasks may involve configuration procedures that are performed automatically by VFM Server 110, while others (e.g., changing a filter) may be performed by homeowners, and still others may require a service provider.

Certain actions 322c may involve "time of day" recommendations, e.g., based on learning the optimal time of day to charge an electric car or operate a pool pump (whether optimized for cost, energy efficiency or other User Goals or combinations thereof). Moreover, systemic factors (such as thermal heat transfer, structural considerations, airflow, etc.) are also taken into account. For example, Action and Goals Optimization Engine 350c may recommend that a dryer that gives off a significant amount of heat be operated in the evening to avoid triggering air conditioning.

Still other actions 322c may involve recommendations to purchase a device or item of equipment or component (to supplement, replace and/or upgrade a unit or component thereof) to address a systemic issue. For example, certain components may wear out with relative frequency, and proactive replacement of such components may result in extending the life of a piece of equipment, or even an entire system (e.g., due to the interdependencies among the operation of particular items of equipment). Here too, these recommendations are affected by the User Goals, whether at the level of an individual item of equipment or a system of equipment, or across the homeowner's entire residence.

As was the case with Alert Generation Engine 350b, Action and Goals Optimization Engine 350c generates not only actions 322c, but also corresponding action attributes 324c. For example, the action attributes 324c identify the particular item(s) of equipment or components to which the action is targeted, as well as quantified details (e.g., a desired setting of an item of equipment, such as a thermostat). They also indicate a severity level, giving the homeowner and/or service provider a sense of the degree of urgency in performing that particular troubleshooting step (and in one embodiment the timeframe or condition necessary before the next step can be determined).

Once Action and Goals Optimization Engine 350c generates an action 322c (along with action attributes 324c), the resulting alert-action pair is then processed by VFM Server 110. In one embodiment, Communications Assistant 124 manages the process of communicating alert-action pairs (and related metadata and other summarized historical data from Home Health Record 126) to homeowners and/or providers.

In some cases, Communications Assistant 124 may determine that the threshold for communicating a particular alert-action pair to a homeowner has not been exceeded. For example, a very minor alert may be associated with "no action" and merely saved in Home Health Record 126 for future iterations. In other cases, the action may be performed by VFM Server 110 without a need even to notify the homeowner. In one embodiment, the homeowner elects whether to receive notifications for particular (e.g., "low severity") alerts and actions.

In the event Communications Assistant 124 notifies the homeowner of the alert-action pair, then the action 322c will be implemented by VFM Server 110 or the homeowner (depending on the particular alert-action pair). The homeowner may also provide feedback (e.g., after checking for particular status data) and even initiate queries to Communications Assistant 124. As noted above, a query will trigger an alert (during a subsequent iteration) and a corresponding "response" action (e.g., providing information on the status of an item of equipment, a system or a whole-home attribute).

Communications Assistant 124 also notifies homeowners when information is required. For example, as noted above, Communications Assistant 124 may query a homeowner to determine whether a prior suggested action (e.g., changing an air filter) has been implemented.

In some cases, the Communications Assistant 124 will also notify a Service Provider 130 or Other Provider 140. For example, a Service Provider 130 may elect to be notified only of alerts and/or actions (with respect to a specified group of homeowners 160) exceeding a particular severity level. But Service Providers 130 may well be notified even when an alert-action pair is not yet recommending actions requiring a service call.

In this manner, Service Providers 130 have an automated "up-to-date" summary of the status of a homeowner's premises 160 enabling them to be proactive (e.g., recommending a preventive service call) and, at the very least, more efficient when the need for a recommended service call arises. In other cases, a Service Provider 130 may perform remote troubleshooting over the phone or via VFM Server 110 (thereby avoiding the need for a physical service call).

Similarly, Other Providers (insurance, warranty, institutional owners, etc.) 140 may also receive over the Homecare Network similar summary status reports regarding a homeowner's premises 160, including summary scores and subscores providing more systemic information. They too can reach out proactively depending upon the particular situation. For example, a warranty provider might offer a homeowner an extended warranty based on an above-average maintenance history or relatively stable performance of particular equipment or systems. Or the warranty provider might offer a discounted warranty for a new unit based on an indication that a particular item of equipment is nearing its end of life.

Many other scenarios for proactive maintenance services will be apparent to those skilled in the art, based upon the valuable "health status" data available to a variety of providers over time. In one embodiment, VFM Server 110 summarizes and targets such information (extracted from Home Health Record 126) for particular types of providers, or even for a specific provider.

Once the action has been generated by VFM Server 110 (but without waiting for a homeowner or provider to implement such action), Home Health Record 126 is updated and the process repeats itself for the next iteration (i.e., receiving sensor data from Premises Controller 158 of each home, etc.). The following scenarios will illustrate relative advantages of the VFM architecture in diagnosing and iteratively troubleshooting particular problems over time.

Scenario #1 AC Unit Problem

In this first scenario, VFM system 100 generates an initial alert indicating that an air conditioning unit (AC unit) is "working too hard" in that It is not achieving its thermostat setting within an expected period of time (based on its operational model). It's power is continuous, yet temperature readings over time are not rising sufficiently to reach the thermostat setting.

The recommended action corresponding to this alert is that the homeowner close a door to a particular room that is a suspected cause of this problem. A door sensor enabled VFM system 100 to be aware that this particular door had been left open for an extended period of time.

Upon performing this action, no more alerts are generated for awhile, and the action appears to have solved the problem. In other words, the AC unit is reaching its temperature set point as expected (within a reasonable tolerance).

After some time has passed (e.g., a few days or weeks), VFM system 100 generates a second alert indicating that the AC unit is making an unusual noise (e.g., based upon a nearby sound sensor). The corresponding action instructs the homeowner to check for a visible obstruction (e.g., a tree limb that may have fallen next to the unit).

Upon checking the AC unit, the homeowner finds no visible obstruction, but confirms that the noise is still present. Shortly thereafter, VFM system 100 issues a third alert equivalent to the initial alert regarding the AC unit working too hard.

In this case, however, VFM system 100 is aware that the door remained closed. Yet, other sensors in proximity to the AC unit (e.g., intake/outtake temperature sensors and pressure sensors) indicate that the freon level of the AC unit is low. So a corresponding action (now part of the $3^{rd}$ related alert-action pair) recommends that coolant (freon) be added.

If the homeowner is capable, VFM system 100 would be configured to instruct the homeowner to add the coolant. Otherwise, a service call is scheduled (with or without the homeowner's approval, depending upon a predetermined configuration option). In any event, the action is completed and the coolant is added. For some period of time thereafter, no further alerts are generated, at least tentatively indicating that the problem has been resolved.

However, many months later, VFM system 100 generates the same alert as the initial alert, indicating that the AC unit is working too hard. Knowing that the coolant had been filled within the past year, VFM system 100 suspects a freon leak and generates an action recommending a service call. A service technician proactively contacts the homeowner via VFM system 100 and schedules the service call.

Because the service technician has been informed of this entire service history over time, the service call is relatively quick, efficient and inexpensive. The freon leak is found and repaired relatively quickly. No further alerts relating to the AC unit are generated for many years, and the problem appears to have been resolved.

At this point, the homeowner has avoided multiple service calls due to proactive alerts and recommended corresponding actions that not only resolved minor symptoms along the way, but eventually resulted in a diagnosis and resolution of a potentially more significant underlying problem (freon leak). Once VFM system 100 diagnosed this problem, it addressed the problem with a single, relatively inexpensive service call (due to the proactive related alert-action pairs generated by VFM system 100 over time, as well as the summary of the AC unit's service history delivered to the service technician over time).

Many years later, however, another alert is generated indicating that the AC unit is again working too hard, and that its power consumption is abnormally high. The corresponding recommended action is to replace the air filters (i.e., preventive maintenance), which the homeowner is capable of doing.

Yet, a short time (e.g., a few days) later, another alert is generated indicating a relatively loud noise and another potential freon leak. The corresponding recommended action at this point is to replace the AC unit with a new more energy efficient model (after recognizing that the expense of what it suspects will be a major repair is not justified, and that the homeowner's User Goals prioritize energy efficiency and reliability over short-term expenses).

Scenario #2 Systemic (System-Wide and Whole-Home) Issues

In this scenario, multiple pieces of equipment are involved, and the homeowner's premises are located in a hot and humid area with relatively extreme weather conditions. The homeowner installs both an AC unit and a dehumidifier which work together to provide a more comfortable cooling environment in the premises, despite the area's hot and humid weather.

Years after the units have been working fine, VFM system 100 generates an alert indicating that the AC unit is working too hard (e.g., because it is 110 degrees Fahrenheit outside, and the AC unit is set to achieve 68 degrees). The corresponding recommended action is to raise the thermostat to 71 degrees (on the assumption that such a temperature will still provide sufficient comfort).

VFM system 100 automatically raises the thermostat to 71 degrees, after notifying the homeowner and receiving permission in accordance with the predefined configuration covering such scenarios. Over a relatively short period of time, however, the outside temperature increased to 115 degrees and VFM system 100 generated the same alert indicating that the AC unit was working too hard.

In this case, the corresponding recommended action was for the homeowner to close the dampers in rooms having relatively low occupancy (determined based upon arrays of strategically placed motion sensors) and to ensure the doors to such rooms remained closed. Nevertheless, VFM system 100 soon generated a third alert, in this case indicating that the dehumidifier was working too hard (evidenced, for example, by a long runtime to reduce the relative humidity below 70 degrees).

Based on an analysis of the operation of these interdependent units over time, VFM system 100 generates a corresponding recommended action of adding a second dehumidifier. In other words, VFM system 100 determined that the hot and humid environment was not being sufficiently addressed by the AC unit and single dehumidifier.

It also recognized that a larger AC unit, or a second AC unit, was far less cost effective than adding a second dehumidifier, which as a system with the AC unit was projected to provide sufficient cooling and comfort. The homeowner purchased the second dehumidifier and received no alerts for many years, effectively solving the problem.

After quite a few years, however, VFM system 100 generated an alert indicating that the AC unit was running inefficiently, and noting that its age indicated that it was nearing the end of its life. The corresponding recommended action was to purchase a new smaller but far more efficient AC unit that would integrate well with the 2 dehumidifiers (a cost-effective solution).

Moreover, the recommended action further suggested adding a heat exchanger and ceiling fans in specified bedrooms to complement the new smaller AC unit. As a result, the homeowner extended the life not only of the original AC unit, but of the larger system itself, which now included the new smaller AC unit, two dehumidifiers, a heat exchanger (to remove excess heat from the premises and heat the pool) and ceiling fans in specified bedrooms.

The invention claimed is:

1. A system that maintains the health of the equipment and infrastructure of one or more properties, the system comprising the following:

(a) a data monitor that receives dynamic data reflecting changes over time in the state of the equipment and infrastructure;
(b) an alert engine that, based in part upon the dynamic data,
  (i) detects an abnormal condition among one or more characteristics of the equipment and infrastructure and, in response,
  (ii) generates an alert representing a symptom of an underlying problem; and
(c) an action engine that generates an action corresponding to an alert, wherein the action is a troubleshooting step designed to address the underlying problem of which the corresponding alert is a symptom, and wherein each alert and corresponding action together constitute an alert-action pair;
(d) wherein the alert engine and action engine together generate over time a plurality of related alert-action pairs designed to address the same underlying problem.

2. The system of claim 1, wherein at least one action of one of the plurality of related alert-action pairs is performed automatically by the system.

3. The system of claim 1, wherein at least one action of one of the plurality of related alert-action pairs is performed by an owner of one of the one or more properties.

4. The system of claim 1, further comprising a service provider network comprising a plurality of service providers with relevant expertise in servicing one or more items of the equipment and infrastructure, wherein one of the plurality of service providers communicates troubleshooting input to the system representing an action corresponding to an alert.

5. The system of claim 1, further comprising a home health record comprising a set of static and dynamic information reflecting the state of one or more components of the equipment and infrastructure of one of the one or more properties, wherein the home health record includes one or more scores quantifying the systemic state of that property, and wherein one of the one or more scores improves as a result of the plurality of related alert-action pairs.

6. A method for maintaining the health of the equipment and infrastructure of one or more properties, the method comprising the following steps:
(a) receiving dynamic data reflecting changes over time in the state of the equipment and infrastructure;
(b) detecting, based in part upon the dynamic data, an abnormal condition among one or more characteristics of the equipment and infrastructure and, in response, generating an alert representing a symptom of an underlying problem;
(c) generating an action corresponding to an alert, wherein the action is a troubleshooting step designed to address the underlying problem of which the corresponding alert is a symptom, and wherein each alert and corresponding action together constitute an alert-action pair; and
(d) generating over time a plurality of related alert-action pairs designed to address the same underlying problem.

7. The method of claim 6, wherein at least one action of one of the plurality of related alert-action pairs is performed automatically.

8. The method of claim 6, wherein at least one action of one of the plurality of related alert-action pairs is performed by an owner of one of the one or more properties.

9. The method of claim 6, further comprising the step of integrating a service provider network comprising a plurality of service providers with relevant expertise in servicing one or more items of the equipment and infrastructure, wherein one of the plurality of service providers communicates troubleshooting input representing an action corresponding to an alert.

10. The method of claim 6, further comprising the step of maintaining a home health record comprising a set of static and dynamic information reflecting the state of one or more components of the equipment and infrastructure of one of the one or more properties, wherein the home health record includes one or more scores quantifying the systemic state of that property, and wherein one of the one or more scores improves as a result of the plurality of related alert-action pairs.

11. A system that maintains the health of the equipment and infrastructure of one or more properties, the system comprising the following:
(a) a home health record comprising a set of static and dynamic data, including historical data, reflecting the state of one or more items of the equipment and infrastructure;
(b) an alert engine that, based in part upon the dynamic data,
  (i) detects an abnormal condition among one or more characteristics of the equipment and infrastructure and, in response,
  (ii) generates an alert representing a symptom of an underlying problem;
(c) a communications assistant that manages communications with a service provider network, the service provider network comprising a plurality of service providers with relevant expertise in servicing one or more items of the equipment and infrastructure; and
(d) a service provider manager that, in response to the generation of an alert,
  (i) generates relevant summary data from the home health record to facilitate troubleshooting of the underlying problem of which the alert is a symptom,
  (ii) identifies a subset of the plurality of service providers with specific expertise in troubleshooting that underlying problem,
  (iii) provides the relevant summary data to the identified subset of the plurality of service providers via the service provider network; and, in response,
  (iv) receives from one of the identified subset of the plurality of service providers, via the service provider network, a recommended action representing a step in troubleshooting that underlying problem.

12. The system of claim 11, wherein the recommended action is performed automatically.

13. The system of claim 11, wherein the recommended action is performed by an owner of one of the one or more properties.

14. The system of claim 1, further comprising a home health record comprising a set of static and dynamic information reflecting the state of one or more components of the equipment and infrastructure of one of the one or more properties, wherein the home health record includes one or more scores quantifying the systemic state of that property, and wherein one of the one or more scores improves as a result of the recommended action.

15. A method for maintaining the health of the equipment and infrastructure of one or more properties, the method comprising the following steps:
(a) storing a set of static and dynamic data, including historical data, reflecting the state of one or more items of the equipment and infrastructure;
(b) detecting, based in part upon the dynamic data, an abnormal condition among one or more characteristics of the equipment and infrastructure and, in response, generating an alert representing a symptom of an underlying problem; and (c) managing communications with a service provider network, the service provider network comprising a plurality of service providers with relevant expertise in servicing one or more items of the equipment and infrastructure, by performing the following steps in response to the generation of an alert:
  (i) generating relevant summary data from the stored set of static and dynamic data to facilitate troubleshooting of the underlying problem of which the alert is a symptom,
  (ii) identifying a subset of the plurality of service providers with specific expertise in troubleshooting that underlying problem,
  (iii) providing the relevant summary data to the identified subset of the plurality of service providers via the service provider network, and, in response,
  (iv) receiving from one of the identified subset of the plurality of service providers, via the service provider network, a recommended action representing a step in troubleshooting that underlying problem.

16. The system of claim 15, wherein the recommended action is performed automatically.

17. The system of claim 15, wherein the recommended action is performed by an owner of one of the one or more properties.

18. The system of claim 15, further comprising the step of maintaining a home health record comprising a set of static and dynamic information reflecting the state of one or more components of the equipment and infrastructure of one of the one or more properties, wherein the home health record includes one or more scores quantifying the systemic state of that property, and wherein one of the one or more scores improves as a result of the recommended action.

19. A system that maintains the health status of the equipment and infrastructure of plurality of properties, comprising:
  (a) a home health record comprising a set of static and dynamic information reflecting the state of one or more components of the equipment and infrastructure of each of the plurality of properties, including one or more scores quantifying the systemic state of each of the plurality of properties;
  (b) a home health record generator that maintains the health status of each of the plurality of properties by modifying the scores as the state of one or more components of the home health record changes over time;
  (c) an alert engine that generates an alert when one or more scores of the home health record indicate the existence of an abnormal condition in one of the plurality of properties; and
  (d) an action engine that generates an action to address the alert.

20. The system of claim 19, wherein the action is performed automatically by the system.

21. The system of claim 19, wherein the action is performed by an owner of one of the plurality of properties.

22. The system of claim 19, further comprising a service provider network comprising a plurality of service providers with relevant expertise in servicing one or more items of the equipment and infrastructure, wherein one of the plurality of service providers communicates troubleshooting input to the system representing an action corresponding to an alert.

23. The system of claim 19, wherein the static information includes identification and room location of individual items of equipment.

24. The system of claim 19, wherein the dynamic information includes sensor data reflecting the state of one or more items of equipment.

25. The system of claim 19, wherein the dynamic information includes attributes of prior alerts and corresponding actions.

26. The system of claim 19, wherein the home health record includes environmental data external to each of the plurality of properties.

27. The system of claim 19, wherein the systemic states of a property include one or more of the following: reliability, efficiency, safety, maintenance, fire risk, flood risk and air quality.

* * * * *